United States Patent [19]

Suzuki

[11] Patent Number: 4,722,064
[45] Date of Patent: Jan. 26, 1988

[54] DRAWING OUTPUT UNIT
[75] Inventor: Kazuhiro Suzuki, Ebina, Japan
[73] Assignee: Fuji Xerox Co., Ltd., Tokyo, Japan
[21] Appl. No.: 794,853
[22] Filed: Nov. 4, 1985
[30] Foreign Application Priority Data Nov. 27, 1984 [JP] Japan .................................. 59-248704
Apr. 17, 1985 [JP] Japan .................................. 60-80093
Apr. 17, 1985 [JP] Japan .................................. 60-80094

[51] Int. Cl.⁴ .............................................. G06F 3/14
[52] U.S. Cl. ...................................... 364/518; 364/200
[58] Field of Search .............................. 364/518–521, 364/200 MS File, 900 MS File; 340/703, 724, 723; 358/141, 160

[56] References Cited
U.S. PATENT DOCUMENTS 3,828,319 8/1974 Owen et al. ...................... 364/200 X
4,069,511 1/1978 Lelke .................................. 364/200
4,075,695 2/1978 Lelke .................................. 364/200

OTHER PUBLICATIONS

International Application Published Under the Patent Cooperation Treaty, Publ. No. WO83/01696, published May 11, 1983 entitled, "Raster Image Processor and Method".

Primary Examiner—Gary V. Harkcom
Assistant Examiner—H. R. Herndon
Attorney, Agent, or Firm—Kinney & Lange

[57] ABSTRACT

Raster information can efficiently be supplied to a high speed printer, whereby system efficiency of a CAD system is elevated through the provision of a drawing output unit wherein a prescribed amount of element information consisting of one or two or more code data for preparing a pattern is stored in an element memory connected with a general bus, then the element information is transferred to an image processor through the general bus, the element information is converted into raster information composed of picture signal corresponding to actually recorded image in the image processor, the raster information is stored in a raster memory having a capacity which can store at least an amount corresponding to that contained in one page of the recorded image through a raster information dedicated bus, and thereafter the raster information read from the raster memory is transferred to the high speed printer through the raster information dedicated bus.

10 Claims, 20 Drawing Figures

FIG. 18
| FILE NO. | PRIORITY OF OUTPUT | DRAWING NUMBER | DRAWING VERSION | NUMBER OF SHEET TO BE PRINTED |
|---|---|---|---|---|
| 1 | 1 | FXB-503041 | A1 | 1 |
| 2 | 0 | FXD-809800 | A4 | 1 |
| 3 | 2 | FXD-809801 | A3 | 5 |
| 4 | 3 | FXH-954342 | B4 | 1 |
FIG. 19
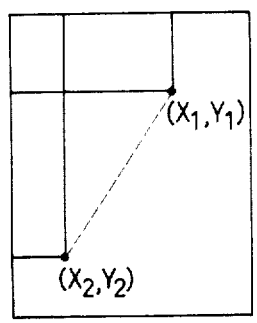
FIG. 20
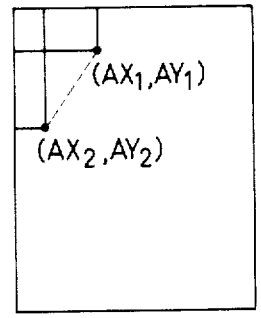

DRAWING OUTPUT UNIT

BACKGROUND OF THE INVENTION

1. Field of the Invention

This invention relates to drawing output units for recording drawings through processing of code data for preparing the drawings.

2. Description of the Prior Art

CAD (Computer Aided Design) systems for designing drawings by means of computer have widely been utilized for machinery and equipment as well as development for various electronic devices and the like.

CAD systems have been variously employed over a range of from so-called stand-alone type systems to large scale systems wherein a number of intelligent terminals 2 are connected to a host computer 1 as shown, for example, in FIG. 1. Such design drawings which were prepared in the latter large scale systems are stored in memories or the like of the host computer with a given data format. For instance, when drawings are outputted in the respective terminals 2 of FIG. 1, a given communications protocol is executed between the terminals 2 and the host computer 1 through a communication control equipment 3 to fetch in the terminals the drawing data stored in the memories.

FIG. 2 is a perspective view illustrating the case where such drawings are outputted by the use of a pen plotter 5 in which a prescribed command is inputted through a keyboard 2a of a terminal 2 by an operator to call the host computer thereby requesting transfer of said drawing data, so that the drawing data are successively transferred from the host computer 1.

The aforesaid drawing data are those obtained by collecting element information for forming one pattern (e.g., image or circle) by the number of patterns to be recorded in the drawings. For example, if certain element information is that relating to a straight line, such element information is composed of a code datum (vector information) for instructing to draw the straight line and two code data showing coordinates of starting and end points of the straight line, i.e., three code data in total. Furthermore, if element information is that as to 1 circle, such element information consists of a code datum for instructing drawing of the circle, a code datum for instructing to paint out the circle black, and code data for indicating a coordinate of the center as well as the radius, i.e., four code data in total. Moreover, there are various code data such as that for instructing polygon and the like.

When one of such element information is inputted, the pen plotter 5 draws a prescribed pattern on a recording paper 7 as a result of operation of amount and direction in the movement of a pen 6 from the coordinate positions of starting and end points in the case, for example, where straight line is drawn. In this case, when processing of one element information is completed, the following element information is processed, and when the final processing of element information is completed, output of the drawings is simultaneously finished.

In such operation, the pen plotter 5 repeats a series of operations as illustrated in FIG. 3. More specifically, the element information is first read (step S1), the command is decoded (step S2), the predetermined operation is effected (step S3), the starting point is set and the pen is put down on the prescribed position (step S4), the motor is driven to detect position of the pen and said pen is transferred to the end point while being in a feedback state (steps S5 and S6), and when the pen reaches the end point, the motor is stopped to put up the pen, thereafter the pen is returned to the starting position (step S7).

As described above, the drawing output unit wherein such pen plotter is utilized requires no conversion of element information into raster information, because when the element information is processed one by one in order, output of the drawing is completed without any additional processing, so that such data processing system can be simplified. On the other hand, there is such a disadvantage in that the manner for preparing drawings in this case is that in accordance with similar mechanical operation to handwriting one, so that a long period of time is required for outputting complicated drawings.

On one hand, an electrostatic plotter has been well known as a drawing output unit in place of the aforesaid plotter.

In the electrostatic plotter an electrostatic latent image is formed on a special recording paper by the use of an electrostatic multi-stylus head provided with needle-like discharge electrodes, and the resulting latent image is developed with use of liquid or powder toner. In case of using such an electrostatic plotter, a fixed amount of element information has previously been converted into such raster information composed of picture signals corresponding to an actually recorded image to store the raster information in memory.

The electrostatic multi-stylus head has such construction that a number of aligned needle-like electrodes 11 are longitudinally divided into a predetermined number of blocks as shown in, for example, FIG. 4 wherein picture signal is supplied to the respective electrodes through signal lines 12. Discharge voltage is fed to the respective blocks through power source lines 13. When the discharge voltage is applied at a time, load of the power source becomes excessive so that the discharge voltage is successively supplied to the respective blocks in accordance with time sharing manner.

In view of a construction of such recording head as described above, the electrostatic plotter divides drawings to be outputted into a plurality of areas corresponding to the blocks of the recording head, the element information in every area is converted into raster information, and the resulting information is supplied to the head through the signal line 12. On one hand, discharge voltage is supplied to the corresponding blocks through the power source line 13 thereby effecting recording in that region, and similar operations are repeated in respect of the other blocks. Such system involving the above described steps has generally been adopted, but this system has had a disadvantage in that both of processing of signal and outputting of drawing cannot be sufficiently speeded up.

Furthermore there are laser printers utilizing electrophotographic method as a unit which can record such raster information at high speed. These laser printers use a system wherein raster information is converted into a light beam in every page, the converted light beam is introduced to the outer surface around a photoreceptor to form an electrostatic latent image, and the resulting photoreceptor is developed with the use of toner.

In order to employ such type of printer, however, it is required that all the element information in each page has previously been converted into raster information.

Besides, once recording operation was started in such a printer just described above, a series of operations proceed until the completion of recording for one page, so that any pause and interruption cannot be permitted in the course of such step. For this reason, it is required that acceptance of element information from an external system and processing for conversion of the element information into raster information can efficiently be carried out so that continuity of such recording operations is not interrupted.

In order to realize such acceptance and processing for conversion, there may be considered such system wherein a memory for storing element information and a memory for storing raster information, or a printer controller and the like are connected to a general bus line as is used in conventional computers, and those connected to the general bus line are subjected to time sharing control by means of a central processing unit. However, in the case of recording operation where raster information is transferred to a printer at high speed, all the other processing must be stopped so that there is a problem in view of efficiency in the system.

Besides, a long period of time is required for converting such element information consisting of complicated drawing into raster information, and in this connection it is difficult to realize faster conversion.

Furthermore such element information which concerns drawings to be outputted to the printer and is transferred either in response to the request from terminals, or automatically from the host computer or other systems comprises both the information which should be quickly outputted and the other information without any urgency. In this respect, indiscriminate processing for such information in accordance with the order of input is not favorable from viewpoint of efficiency in the system. Moreover there is a case where it is frequently requested to enlarge or reduce (scale up or down) drawings. In this case, it is necessary either for providing a dedicated processor or the like therefor, or that the information is subjected to required processing, and then such information is transferred to the drawing output unit. However, such arrangements as described above bring on difficulty such that load of installation cost or the host computer becomes larger.

The present invention has been made for eliminating the above-mentioned disadvantages and problems.

SUMMARY OF THE INVENTION

It is the first object of the present invention to provide a drawing output unit having functions due to which raster information to be outputted to a high speed printer can efficiently be prepared.

The second object of the present invention is to provide a drawing output unit which can successively record at high speed such element information which is inputted from an external system one after another.

The third object of the present invention is to provide a drawing output unit which can realize accepting operation of element information or converting operation of the element information into raster information simultaneously with its recording operation.

The fourth object of the present invention is to provide a drawing output unit which can suitably select two or more inputted drawing information irrespective of the entry sequence thereof to record the information in arbitrary order.

The fifth object of the present invention is to provide a drawing output unit which can store inputted drawing information in response to necessity and record repeatedly the information.

The sixth object of the present invention is to provide a drawing output unit which processes inputted drawing information to record the same.

The seventh object of the present invention is to provide a drawing output unit which selects stored drawing information in accordance with the order which has been previously determined by an operator to automatically record the same.

The characteristic features of the present invention reside in that raster information can efficiently be supplied to a high speed printer, whereby system efficiency of the CAD system is elevated through the provision of a drawing output unit wherein a prescribed amount of element information consisting of one or two or more code data for preparing a pattern is stored in an element memory connected with a general bus, then said element information is transferred to an image processor through said general bus, said element information is converted into raster information composed of picture signals corresponding to an actually recorded image in said image processor, said raster information is stored in a raster memory having a capacity which can store at least an amount corresponding to that contained in one page of the recorded image through a raster information dedicated bus, and thereafter the raster information read from said raster memory is transferred to said high speed printer through said raster information dedicated bus.

Furthermore the characteristic features of the present invention reside in that to said general bus is connected a final controlling element which can input and/or modify such information for transferring or processing the element information stored in said element memory, whereby two or more of drawing information can be outputted in arbitrary order irrespective of the input order thereof, and that the information may be outputted after it is suitably subjected to, for example, enlarging or reducing processing.

BRIEF DESCRIPTION OF THE DRAWINGS

FIG. 18 is an explanatory diagram showing the contents of a memory in a final controlling element of the third embodiment; and FIGS. 19 and 20 are diagrams for explaining enlarging and reducing operations of element information, respectively.

DETAILED DESCRIPTION OF THE INVENTION

(Explanation of Block)

Figure 1:
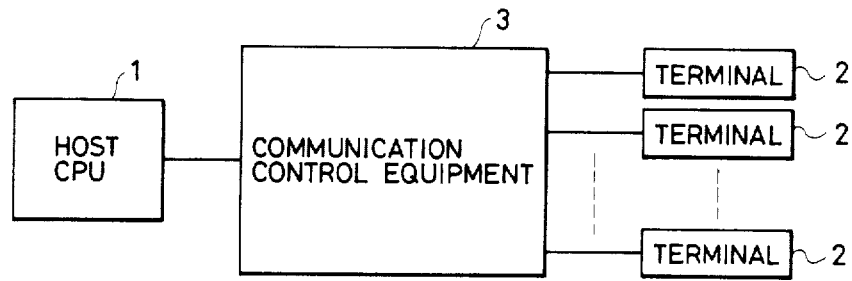
FIG. 1 is a schematic system configuration diagram illustrating a conventional CAD unit.
Figure 2:
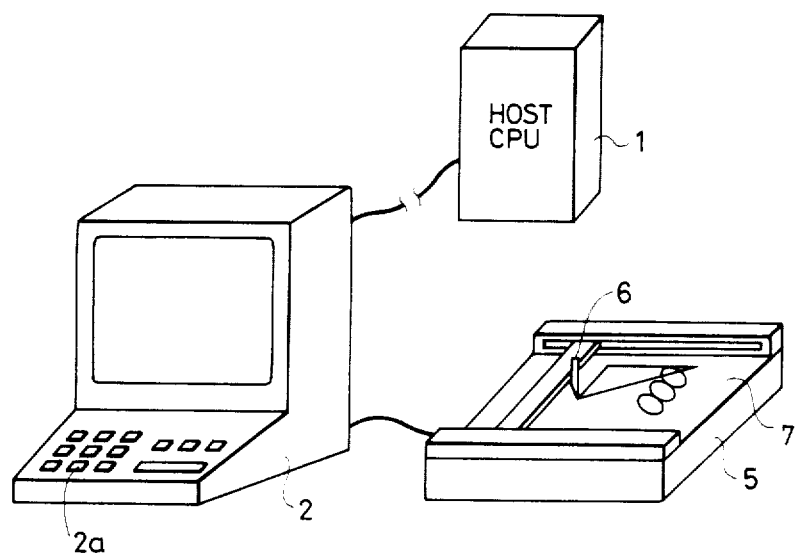
FIG. 2 is a perspective view showing a conventional pen plotter type drawing output unit.
Figure 3:
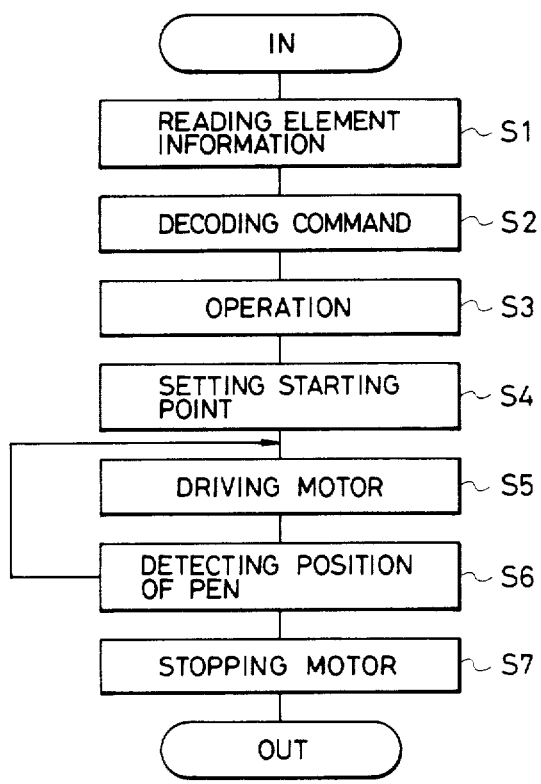
FIG. 3 is a flow chart for explaining operation of the unit of FIG. 2.
Figure 4:
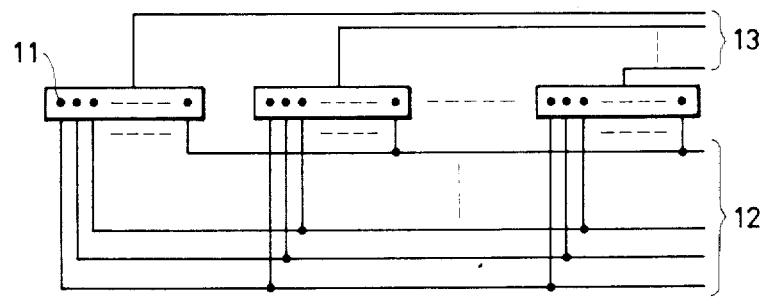
FIG. 4 is a block diagram showing an essential part of a conventional electrostatic plotter.
Figure 5:
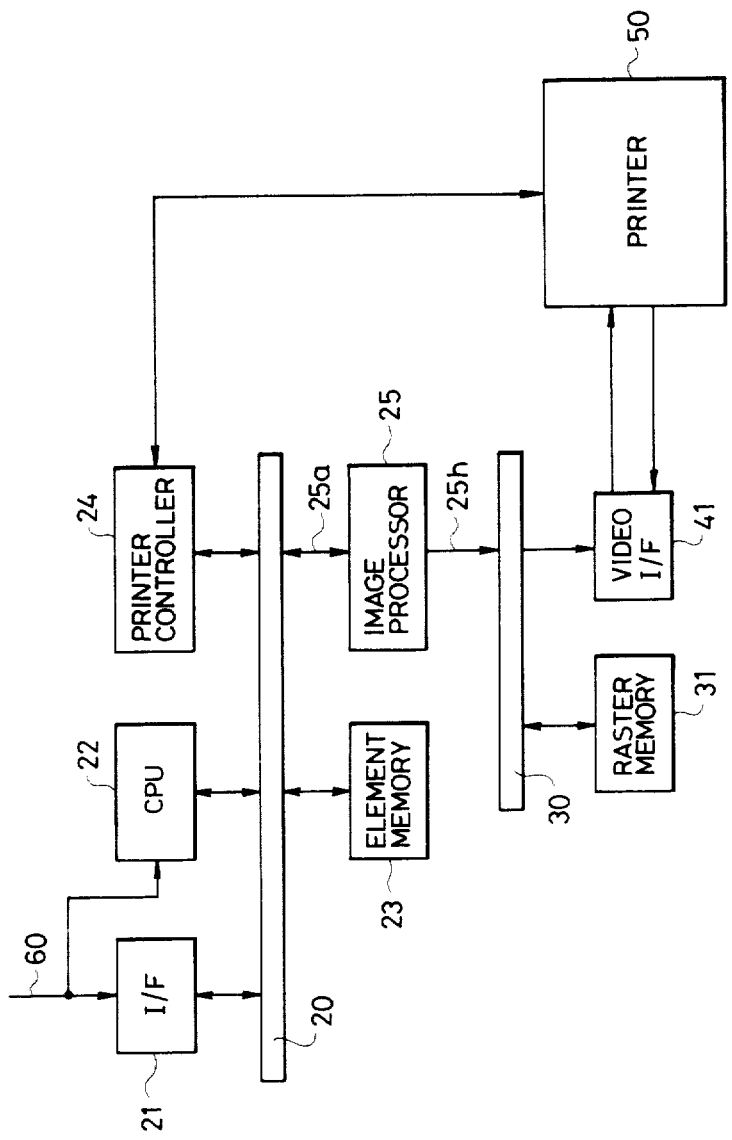
FIG. 5 is a block diagram illustrating the first embodiment of the drawing output unit according to the present invention.

FIG. 5 is a block diagram illustrating the first embodiment of the drawing output unit according to the present invention.

The drawing output unit has such a construction wherein respective functional blocks are connected to two bus lines 20 and 30 which are separately and independently formed, and raster information is transferred to a high speed printer 50 such as laser printer or the like to record the information.

First of all, to the first bus 20 are connected an interface 21, a central processing unit (hereinafter referred to simply as "CPU"), an element memory 23, a printer controller 24, and an image processor 25, respectively.

The interface 21 forms a known circuit construction which effects matching of information transfer between an external system (not shown) and the first bus 20. Furthermore the element memory 23 is composed of, for example, random access memory (RAM) elements each of which can store an amount of element information contained in one or several pages, or a hard disc device or the like which can store a large amount of element information contained in several or more pages.

The CPU 22 is composed of a well known microprocessor, memory elements required for the operation therefor, and the peripheral circuits thereof. The CPU controls operations of the respective devices in accordance with a predetermined program. This program has been stored in a memory element (not shown) incorporated therein. Targets of the control are, for example, processing for fetching element information from an external system through the interface 21, processing for converting element information into raster information by means of the image processor 25, processing for operating the printer 50 by means of the printer controller 24 and the like processing, thus the CPU generalizes and controls the whole system.

The printer controller 24 is a known circuit incorporating a sequencer which stores a series of sequences such as paper feeding of the printer 50, driving of a photoreceptor and the like to automatically control the printer.

The image processor 25 is composed of an exclusive microprogram mode processor for element information/raster information conversion and it has functions for operating element information read from the element memory 23 and converting successively the operated information into raster information to output the converted information.

As described above, the first bus 20 transmits commands outputted from the CPU 22 for controlling the respective parts of the unit, returns response signals from the respective parts, and further transfers element information. Hence the first bus 20 has substantially the same construction as that of a general bus line which has been used heretofore in common computers.

On the other hand, to the second bus 30 are connected an output terminal 25h of the image processor 25, a raster memory 31, and a video interface 41, respectively. Since the other devices or the like are not connected with the second bus 30, this bus line has a simple construction for only very limited small number of signal lines such as address bus, data bus, transmission line for write enable signal into memory and the like lines. In other words, the second bus 30 is composed of an exclusive bus which can transfer raster information such as address, raster data, write enable signal and the like at high speed.

The raster memory 31 is composed of a video RAM or the like having a capacity which can store raster information in an amount corresponding to at least one page of the drawings which are to be recorded by means of the printer 50.

The video interface 41 is a circuit for feeding an address signal to the raster memory 31 in response to a request from the printer 50, reading the raster information in accordance with a sequence of address, and transferring the information to the printer 50. This circuit consists of a parallel-serial converting circuit for outputting the raster information fed through the second bus 30 in series, a counter for addressing the raster memory 31 and the like.

It is to be noted that constructions and operations of the printer components will be described later in the paragraph <Explanation of Recording Operation>, whilst operations and constructions of the respective component parts of the unit will be described hereinbelow in more detail in due order.

(Explanation for Operation of Unit)

Storage of Element Information

Element information is obtained by combining a certain number of code information as described hereinbefore, such element information has been prepared by means of a CAD system or the like, and the information has been stored in a memory of its host computer. The information thus stored is restored in the element memory 23 of the unit shown in FIG. 5 by means of on-line or batch processing.

In case of on-line processing (This is the most common processing.), element information 60 is transferred from, for example, a DMA (direct memory access) device of the host computer to the element memory 23 by means of DMA processing through the interface 21.

Figure 6:
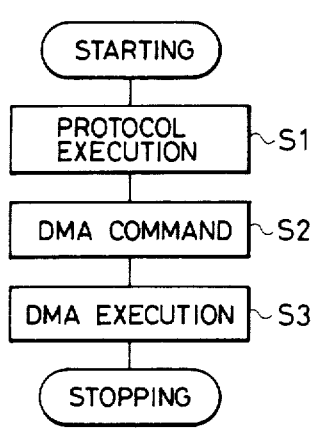
FIG. 6 is a flow chart showing an example for inputting element information in the first embodiment.

The procedure is as follows as illustrated in FIG. 6, i.e., a given communications protocol is executed between the CPU and the host computer (step S1), then DMA processing is started by DMA command (step S2), thereafter element information is automatically fed to the element memory 23 through the interface 21 (FIG. 5) and stored therein in accordance with sequence of address (step S3).

In the case where no DMA is executed, the CPU 22 receives the element information 60 from the host computer, and the information is successively stored in the element memory 23.

Construction and Processing for Element Information

Figure 7:
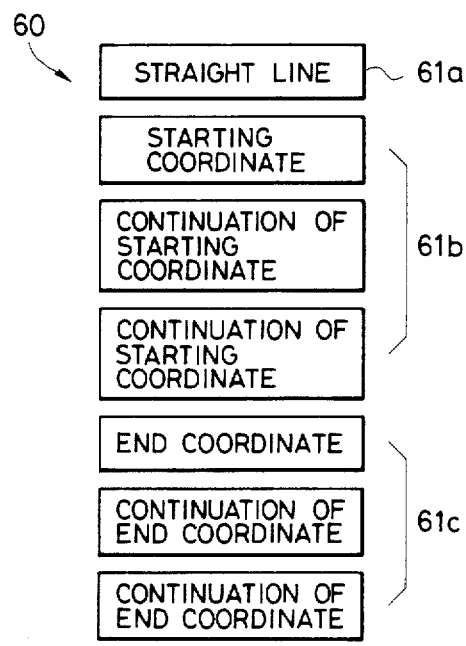
FIGS. 7, 8, and 9 are explanatory views each illustrating contents of element information.
Figure 8:
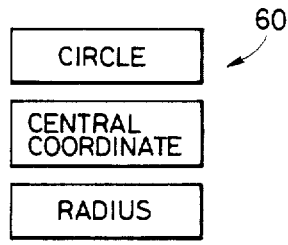
Figure 9:
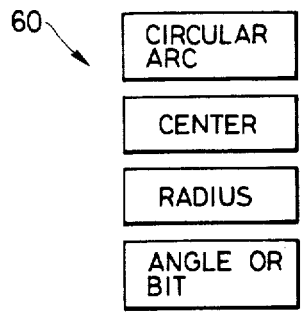

The element information 60 comprises, for instance, a code datum 61a which means to draw straight line, and code data 61b and 61c indicating coordinate positions of starting and end points of the straight line as illustrated in FIG. 7. In the case where length of a code datum is too long, such code datum is divided with a suitable length which can be transferred by the first bus, and then the divided code datum components are transferred as illustrated in FIG. 7. FIG. 8 indicates a series of the element information 60 for drawing a circle, and FIG. 9 indicates a series of the element information 60 for drawing a circular arc, respectively.

Such element information 60 involves two types of information, i.e., one of which can directly be converted into raster information by means of the image processor 25 of said unit shown in FIG. 5 and another of which is required that the element information has previously been converted into a prescribed format. In the case where the CPU 22 receives element information and the information is successively stored in the element memory 23, such information is simultaneously converted into a required format with the above procedure. On the other hand, since such element information which has been directly stored in the element memory 23 by means of DMA processing had not yet been converted, format of the element information in the element memory 23 must be converted by the CPU prior to the conversion into raster information at a suitable timing.

Figure 10:
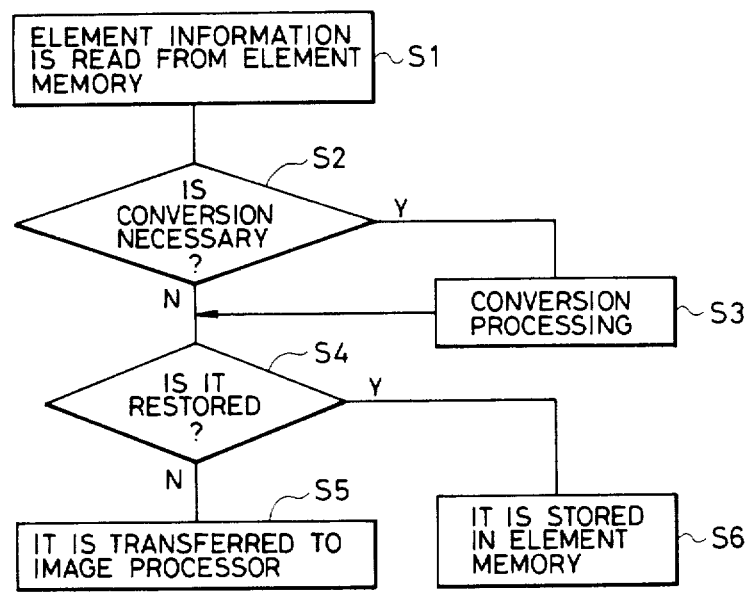
FIG. 10 is a flow chart for explaining processing of element information.

FIG. 10 is a flow chart illustrating the procedure as mentioned above wherein first, the CPU 22 reads element information from the element memory 23 (step S1), said CPU judges whether or not conversion is necessary (step S2), required format conversion is processed (step S3), it is judged whether or not either the converted information is transferred to the image processor, or stored again in the element memory 23 (step S4), and then transfer (step S5) or storage (step S6) of the information is processed.

Conversion of Element Information into Raster Information

Figure 11:
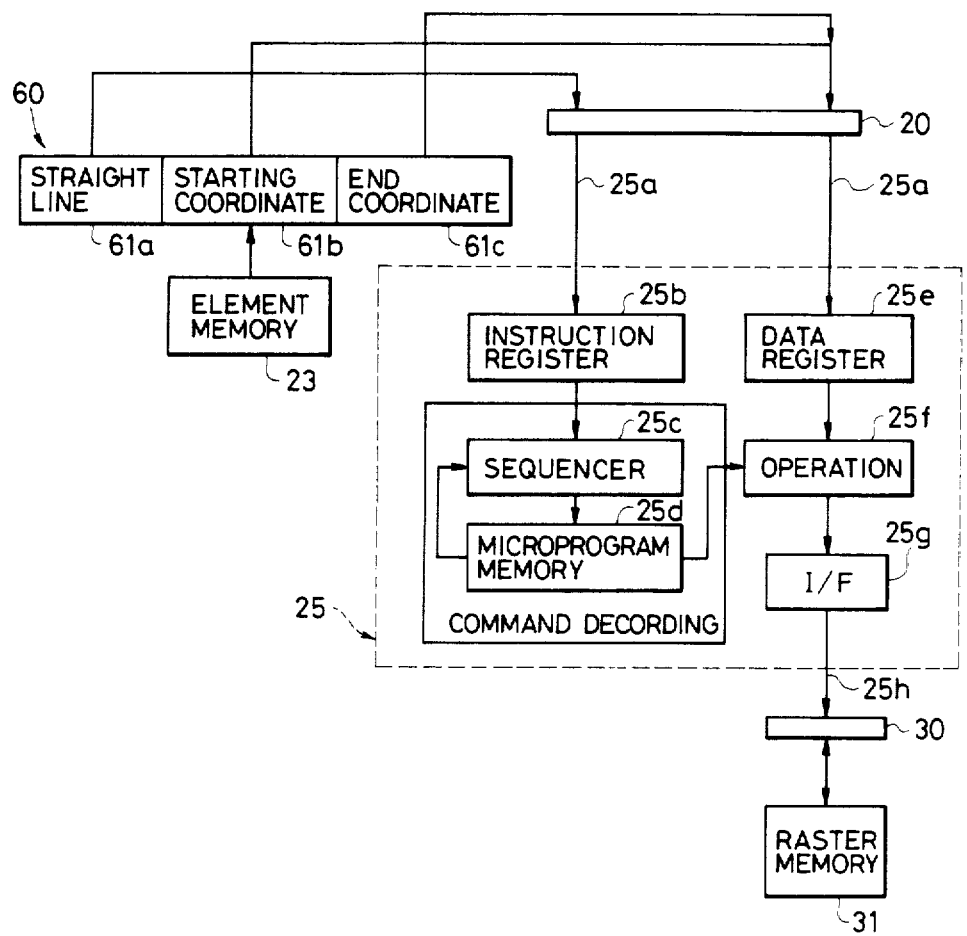
FIG. 11 is a block diagram for explaining operation of converting element information into raster information.

FIG. 11 is a block diagram for explaining a series of operations in which element information is transferred from the element memory 23 to the image processor 25 to convert the same into raster information.

First, the CPU 22 (FIG. 5) feeds a command having such meaning that converts a prescribed number of element information beginning with a specified address in the element memory 23 into raster information to an instruction register 25b of the image processor 25, whereby the image processor 25 starts conversion processing of a series of element information into raster information.

First of all, one of element information 60 is read from the element memory 23. If this element information is that having such contents to draw straight line being described in conjunction with FIG. 7, the code datum 61a meaning straight line is first inputted. Then, the code data 61b and 61c meaning starting and end coordinates, respectively, are inputted to a data register 25e.

Based on these code data, a sequencer 25c outputs a series of address signals to a microprogram memory 25d. The microprogram memory 25d is accessed by means of said address signals to transfer data for deciding a next address to the sequencer 25c and at the same time, to feed an operation assigned code to an arithmetic unit 25f. The arithmetic unit 25f effects various operations in accordance with said operation assigned code, and the data required for such operations are suitably supplied from the data register 25e. The contents of such operations are those which calculate that, for instance, when a drawing to be outputted is divided into dots (picture elements), the straight line required to be drawn by this element information can be drawn by making which dots black. Contents of the data outputted as a result of operations are those obtained by aggregating raster addresses of the picture signal which should have outputted black dots in accordance with the element information. They are raster information corresponding to the element information as to a straight line.

In the case where, for example, a circle is drawn, such operation instruction code for drawing a circle is fed from the element memory 23 through the first bus 20, and the code is written in the instruction register 25b. Furthermore code data such as central coordinate, radius and the like are read and written in the data register 25e. Then, address signals are outputted from the sequencer 25c to the microprogram memory 25d in accordance with said operation instruction code, so that the operation instruction code necessary for drawing the circle is successively supplied from the microprogram memory 25d to the operation unit 25f. In the operation unit 25f, required data (code data such as central coordinate, radius and the like) are suitably fetched from the data register 25e in response to said operation assigned code, a predetermined operation is carried out, and, for example, a raster address of the part corresponding to circumference of the circle is calculated for one dot or plural dots. In other words, such data indicating address on the raster memory 31 corresponding to a part which should be black dots in an output drawing are calculated for one dot or plural dots, and they are outputted as raster information.

In the present embodiment, for instance, LSI 2910 (manufactured by AMD Co.) has been employed as said sequencer 25c, and LSI 2901 or LSI 29116 (manufactured by AMD Co.) has been used as the operation unit 25f.

Figure 12:
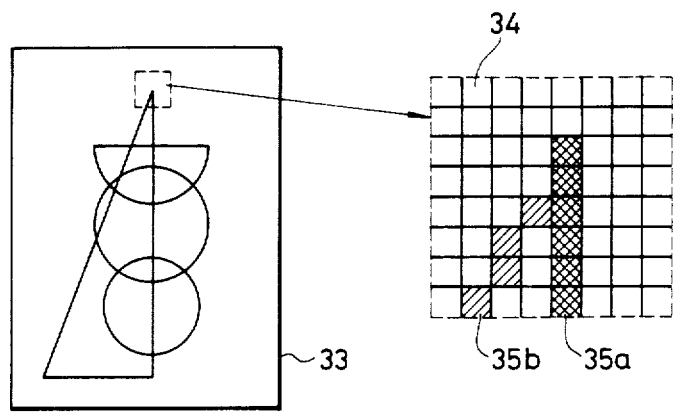
FIG. 12 is an explanatory diagram illustrating the contents of a raster memory.

Such raster information as described above is outputted to the second bus 30 through an interface 25g, and the information is stored in the raster memory 31. Contents of the raster memory 31 are those obtained by aggregating picture signals which have been decided that which dots of white or black ones should be outputted for one drawing in every picture elements 34 consisting of the drawing 33 to be outputted, for example, as illustrated in FIG. 12. Namely, all the picture signals, for example, corresponding to vertical 5000 picture elements and horizontal 3000 picture elements of the raster memory 31 are in, for instance, "0" state corresponding to white dot before raster information has been written. Due to conversion of the first element information, picture signal corresponding to a prescribed straight line is reloaded to "1", so that prescribed picture signals are successively reloaded from "0" to "1" in such that a picture signal corresponding to, e.g., circle is converted to "1" by means of the following element information. Such picture signal which has already been in "1" state is not converted any more, even if a signal which makes said picture signal to "1" is again inputted.

An area enclosed with a broken line in FIG. 12 is enlarged and shown on the right-hand side of the drawing wherein raster information is created in such that first, such picture signal corresponding to a crosshatched part 35a is written, and then a signal corresponding to a crosshatched part 35b is written.

As described above, element information is successively converted by the image processor 25, so that such raster information for outputting that corresponding to one page of drawings is stored in the raster memory 31.

Explanation of Recording Operation

Figure 13:
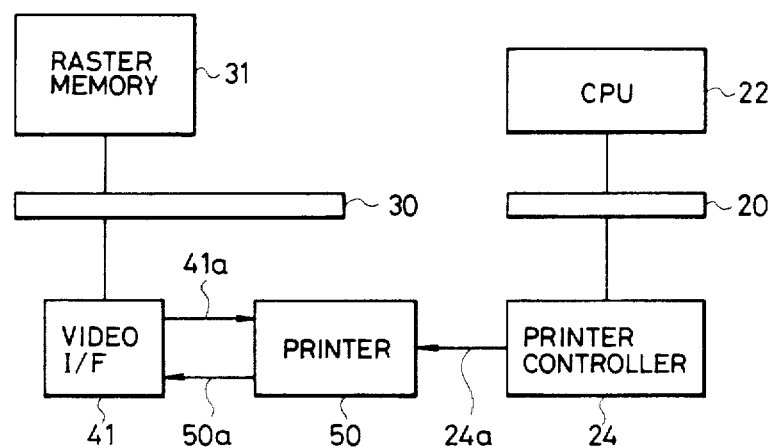
FIG. 13 is a block diagram for explaining recording operation of a printer.

Next, recording operations of the drawing output unit according to the present invention will be described hereinbelow by referring to FIG. 13 wherein when all the raster information corresponding to one page of drawings are stored in the raster memory 31, the CPU 22 outputs a record starting command to the printer controller 24 at a suitable timing. The printer controller 24 controls a series of operations in the printer 50 in response thereto, and at the same time raster information is transferred from the raster memory 31 to the printer 50 through the video interface 41 to effect recording of the drawings. When it has completed recording of one page of drawings, the printer controller 24 stops automatically the printer 50 to turn it into a stand-by state.

Figure 14:
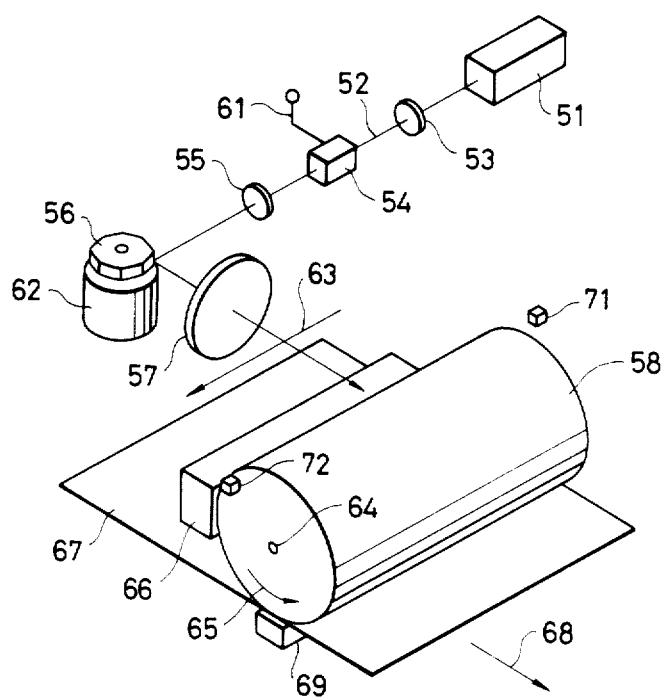
FIG. 14 is a perspective view showing an essential part of a printer.

FIG. 14 is a perspective view showing an essential part of a laser printer suitable for embodying the present invention wherein a laser beam 52 emitted from a laser oscillator 51 passes through a polarizer 53, a laser beam modulator 54, and another polarizer 55, respectively, and the laser beam is then reflected by a polygon mirror 56 to reach the outer surface around a photoreceptor 58 through a lens 57. The picture signal is inputted from a terminal 61 to the laser beam modulator 54, and the signal rotates the plane of polarization of the laser beam passing through the modulator 54 by means of, for example, the electrooptical effect in response to the picture signal. A white and black binary picture signal is converted into an optical on-off signal of laser beam by means of this, so-called electric shutter action, whereby such converted signal is emitted on the outer surface around the photoreceptor 58. The polygon mirror 56 is rotated by means of a pulse motor 62 at a constant speed, and the laser beam 52 is reflected by the mirror so that it is scanned in a direction of arrow 63. During a period in which such optical signal converted from one line of picture signal is emitted in a direction parallel to a rotating shaft 64 of the photoreceptor 58 (the direction of arrow 63), the photoreceptor 58 rotates in the direction of arrow 65. Thus, an electrostatic latent image involving just the same contents with that shown in FIG. 12 is formed on the outer surface around the photoreceptor 58.

With rotation of the photoreceptor 58 in the direction of arrow 65, the electrostatic latent image passes through a developing device 66 and in which toner adheres in response to the electrostatic latent image. When a recording paper 67 is supplied by a recording paper feeding mechanism (not shown) along the direction of arrow 68, the toner adhered on the outer surface around the photoreceptor 58 is transferred to the recording paper 67 by means of function of a transferring machine 69. The recording paper 67 is further transmitted in the direction of arrow 68 and is subjected to processing such as fixing and the like thereby completing output of drawings. The laser beam 52 is scanned in the direction of arrow 63 with a width extending beyond the both ends of the photoreceptor 58, whereby transit of the laser beam is detected by a scanning starting sensor 71 and a scanning terminating sensor 72, so that the detected pulse is fed to the video interface 41 (FIG. 13) as a synchronizing signal. Hence transfer timing of the picture signal is determined.

Operations of the circuit illustrated in FIG. 13 will be described in more detail hereinbelow by referring to a flow chart of FIG. 15.

Figure 15:
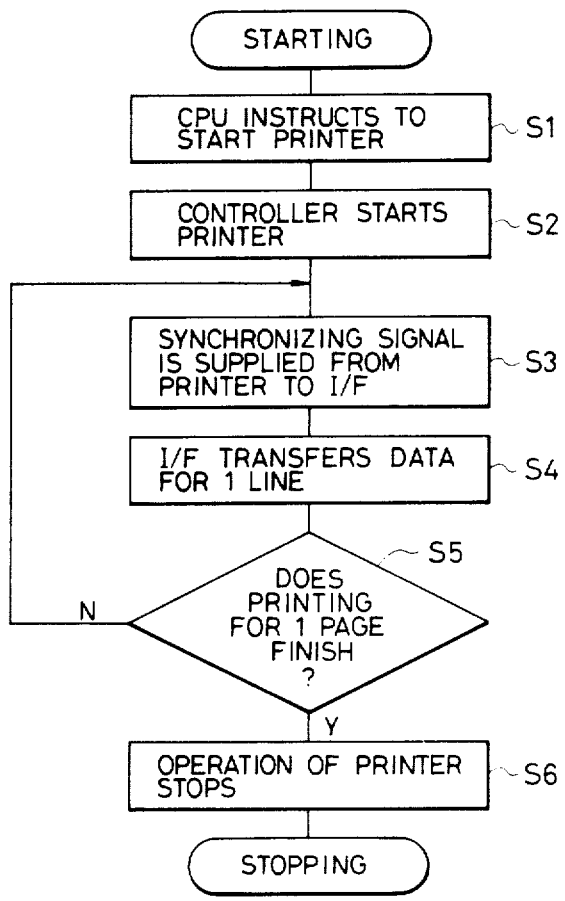
FIG. 15 is a flow chart for explaining printing operation.

First, the CPU 22 outputs a printing start command to the printer controller 24 (step S1 in FIG. 15). Then, the printer controller 24 rotates the pulse motor 62 of the printer and the photoreceptor 58 (FIG. 14) to commence feeding of the paper 67 (step S2 in FIG. 15). Thereafter, when the paper 67 reaches a predetermined position and a synchronizing signal 50a (FIG. 13) is outputted to the video interface 41 (step S3 in FIG. 15), the video interface 41 reads one line of the picture signal 41a, i.e., raster information from the raster memory 31 to transfer the same to the printer 50 (step S4 in FIG. 15). The printer controller 24 judges whether or not the printing for one page is finished (step S5 in FIG. 15). When the step S5 is judged "YES", the printer controller 24 stops operation of the printer 50 (step S6 in FIG. 15), and the printer controller becomes a stand-by state for the following recording operation.

A series of operations described above are commenced as a result of inputting such command that start the recording operation of the contents involved in a specified raster memory from the CPU 22 to the printer controller 24. Thereafter one page of drawings is automatically outputted, and it is automatically stopped. In this respect, the CPU does not participate in this recording operation other than instruction for the starting, so that the other workings such as fetching or conversion of element information and the like may proceed.

For instance, it is assumed that the picture signal can be transferred to this laser printer at a rate of 40 megabit per second. In this case, when a drawing having a recording density of 400 dots per inch (25.4 mm) is prepared, such drawing having A2 size (Japanese Industrial Standards) may be prepared at a speed of 300 mm per second (one sheet per 2 seconds).

The printer to be utilized in the present invention is not limited to a laser printer, but it is apparent that when high-speed electrophotographic type printers such as LED printer, heat transfer type printer or electrostatic transfer printer using a thermal head and the like are applied to the present invention, they are very effective, because of such fact that it is preferable for these high-speed electrophotographic type printers to supply dot information at high speed.

In the present embodiment, two buses of the first bus 20 and the second bus 30 have been provided, and the raster memory 31 has had a capacity in which raster information can store one page of drawing.

For this reason, simultaneous operation to the effect that element information of the following drawing may be stored in the element memory 23 from the host computer interface 21 in even a period wherein the raster information which has been subjected to element/raster information conversion in the image processor 25 and stored in the raster memory 31 is outputted to the printer 50 by means of function of the video interface 41 becomes possible. Thus, such raster information for outputting to effect high-speed printing can efficiently be obtained.

Figure 16:
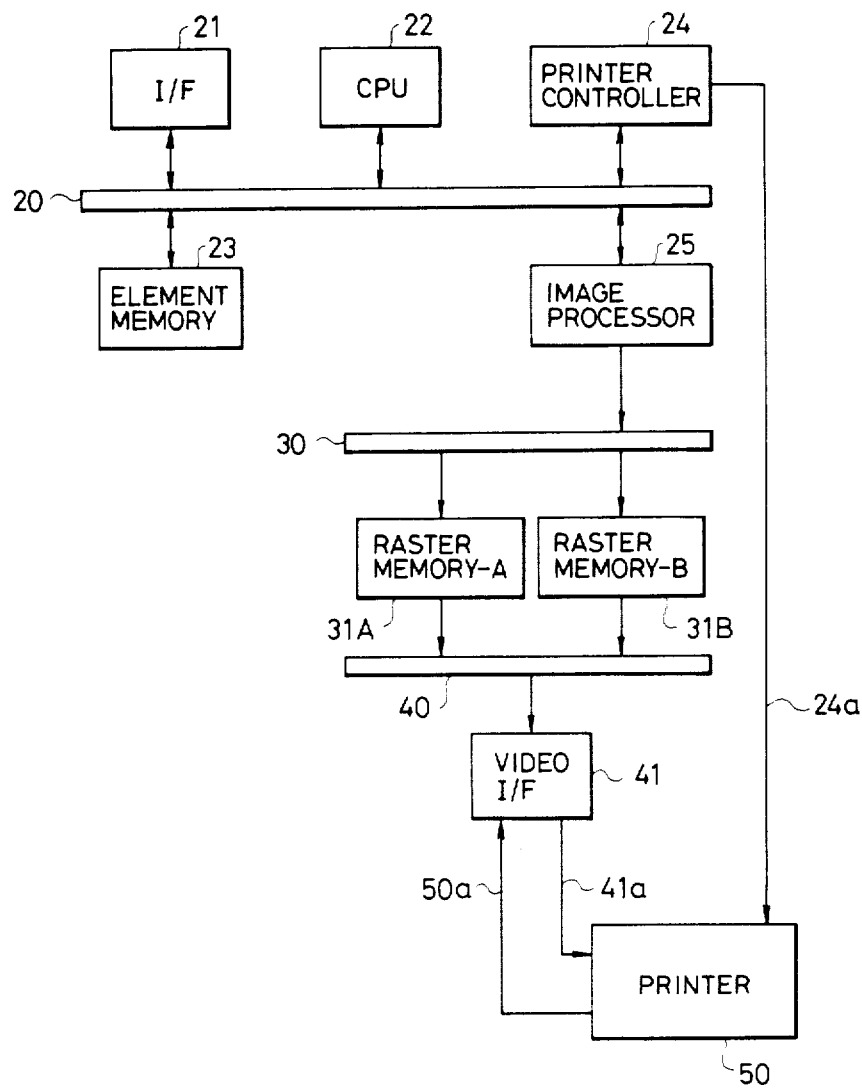
FIGS. 16 and 17 are block diagrams illustrating the second and third embodiments of the drawing output unit according to the present invention, respectively.

Next, the second embodiment of the present invention will be described hereinbelow in conjunction with FIG. 16 wherein like reference characters designate like or corresponding parts throughout FIGS. 5 and 13. The second embodiment differs from the first embodiment shown in FIG. 5 in that a third bus 40 for exclusively transferring raster information which is similar to the second bus 30 is provided and to which are connected output terminals of first and second raster memories 31A and 31B each having a capacity which can store raster information for one page of drawings as well as input terminal of a video interface 41.

According to the above second embodiment, since each of the first and second raster memories 31A and 31B has a capacity which can store one page of raster information, the following operations (1)–(3) can be executed at the same time.

(1) Inputting element information to the element memory 23 from the host computer interface 21.

(2) Storing such raster information obtained through element/raster information conversion in the image processor 25 into the first raster memory 31A.

(3) Reading dot information from the second raster memory 31B in which information corresponding to one page of drawing has already been stored to output said dot information to the printer 50.

Thus, according to the second embodiment, dot information corresponding to plural sheets of drawings can be continuously supplied to the printer at high speed, so that such plural sheets of drawings can continuously be printed out from the printer.

In the present embodiment, it is obvious that the same advantageous effects as those described above can be obtained even though the third bus 40 is deleted and the video interface 41 is connected with the second bus 30.

The third embodiment ot the present invention will be described hereinbelow by referring to FIG. 17 in which like reference characters designate like or corresponding parts throughout FIG. 16.

The third embodiment differs from said second embodiment from constructional point of view in that a disk memory 26b wherein a large amount of element information can be stored is connected to the first bus 20 through a disk memory interface 26a other than the element memory 23 and that a final controlling element 27 is connected with the first bus 20.

The final controlling element 27 is composed of a keyboard 27b through which necessary information is inputted by operator, a video display 27c monitoring the contents thereof (hereinafter referred to simply as "CRT"), a memory 27d storing information to be processed which has been inputted by the operator, and an interface 27a controlling input and output of signals in the final controlling element 27.

(Operation of Final Controlling Element)

Operation for Information to be Processed

Figure 17:
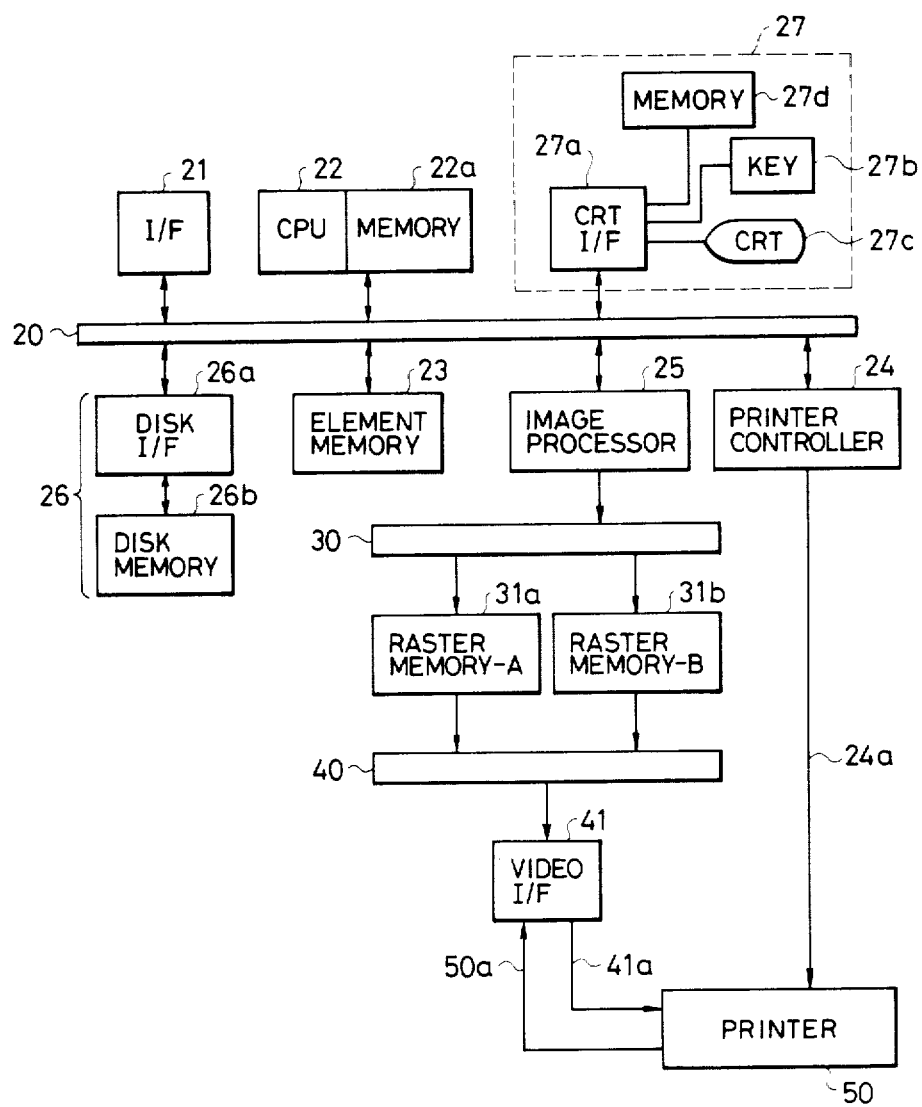

The drawing output unit of the present embodiment effects essentially the same recording operations with those of said first embodiment, but since the unit of the present embodiment can store a large amount of drawing information in an element memory 23 or the disk memory 26b, the processing order or the like thereof may always store in a memory 22a of a CPU 22 (FIG. 17). In the case where the CPU issues converting command for element information, printing command and the like, the CPU issues required commands after reading always processing information stored in said memory.

The contents of such processing information are those as shown in, for example, FIG. 18. More specifically, a series of file numbers are assigned to each information stored in the element memory 23 and the disk memory 26b. Such menu in which are written priority of output, drawing number, drawing version, number of sheets to be printed and the like in every file numbers is prepared. The contents of the menu are stored in memories without any modification in accordance with coded form, and on one hand the same contents are indicated in the CRT 27c.

When operator inputs command through keys 27b, the contents of drawings, the priority of output therefor and the like stored in all the memories can be confirmed. If desired, the contents thereof may be changed in accordance with such a manner that cursor is set in an item of, for example, number of sheets to be printed. When the operator modifies the processing information on the CRT screen as described above, a memory 22a is updated in accordance with such modified contents. Data as to drawing number, drawing version and the like are fed from the host computer together with element information. There is sometimes a case where priority of output is assigned by the host computer.

Execution of Output with Priority

The CPU reads first, contents of a memory 22d in this final controlling element to confirm such file to be outputted with the highest priority. Thereafter the CPU outputs such command to the effect that element information contained in said file is converted into raster information to an image processor 25.

In these circumstances, it may be arranged in such that the CPU reloads such priority of output in the file output of which has been finished as "0", so that the operator can confirm such files output of which has been completed. After the confirmation, intention for erasing or saving the files may be transferred to the CPU 22 by the operator with the use of the keys 27b. For instance, such information order in output of which is "100" or more might have been preset to effeot output in the nighttime. As a result, such output of drawings having no emergency may be postponed.

Execution of Enlargement and Reduction

In the case when operator wishes to reduce, for example, the drawing having file number 1 as shown in FIG. 18 to that of A3 size, the operator outputs first such menu as indicated in FIG. 18 on the CRT 27c, and then the file number is changed from 1 to a new number, e.g., 8. This operation may be carried out by moving a cursor to the item of file number, and typing number "8" on the numeral "1". Thus, such menu having the contents of file number 1 has also been prepared in file number 8. Thereafter, drawing version "A1" is reloaded to "A3", and the contents relating thereto have been inputted to the memory 22a. Before the CPU 22 instructs output of drawing in file number 8, the CPU reads contents of the memory 22a to convert element information as to file number 1 contained in the element or disk memory in accordance with the quite same manner as that described in connection with FIG. 10, so that a new file having file number 8 may be prepared.

FIGS. 19 and 20 are explanatory views each illustrating the signal processing for the above operations.

More specifically, it is assumed that element information involving such contents to draw straight line is represented by coordinate of starting point $(X_1, Y_1)$ and coordinate of end point (X$_2$, Y$_2$) as shown in FIG. 19. In this case, the respective coordinates are multiplied by ratio of scaling down A to obtain starting point (AX$_1$, AY$_1$) and end point (AX$_2$, AY$_2$), respectively. As a result, a prescribed scaling down is processed as shown in FIG. 20, and this operation may be effected by the CPU 22.

Execution for Number of Sheet to be Outputted

In the case where, for example, number "5" has been assigned to the sheets to be outputted as in file number 3 shown in FIG. 18, the CPU 22 instructs output of drawing with respect to the printer controller 24, thereafter the output of drawing for one page is completed, and when the printer controller becomes stand-by state, the CPU outputs instantly such command that the same output of drawing should be repeated. In this case, since raster information has been stored in any of raster memories with no modification, such information is read repeatedly with required times to operate the recording processing.

As described above, the number of sheets which has been assigned in the menu may be outputted.

According to the drawing output unit of the third embodiment of this invention as described above, priority of drawings to be outputted may suitably assigned, interruption handling for emergent drawings can be executed, besides such manner that information which is not emergent may be automatically outputted in the nighttime or the like manner can be also adopted, so that efficiency in utilizationof the unit can be increased.

Furthermore enlarging and reducing processing may be effected by the drawing output unit itself, so that it may be intended to decrease load of the host computer. Furthermore it is also possible to automatically output a large amount of necessary drawings by designation or the like of pages to be outputted.

Furthermore, in accordance with such construction that the first bus utilized for transferring element information and transmitting control signal in other parts, the second bus used for transferring raster information to a raster memory, and the third bus used for transferring raster information to the printer are independently provided one another, and two or more raster memories are provided as described above, storing operation of element information to the element memory or converting processing of element information into raster information can proceed simultaneously with recording operation in the printer.

Thus, according to the construction as described above, it becomes possible that raster information is written in either of random access memory while reading raster information from another raster memory to record the information in the printer. Hence a large amount of drawings can successively be outputted with the minimum loss time. Moreover it is also possible to continuously output the same contents of drawings.

In addition, since these second and third buses may be designed for exclusively transferring raster information, the construction therefor may also be simplified and speeding up of data transfer processing may also be intended. It is to be noted that said second bus may be commonly used for the third bus.

What is claimed is:

1. A drawing output unit wherein a prescribed amount of element information consisting of at least one code datum for preparing a pattern is stored, said element information is converted into raster information composed of a picture signal corrsponding to an actually recorded image, and the converted raster information is transferred to a printer to obtain the recorded image, comprising a general bus, a first raster information dedicated bus and a scond raster information dedicated bus, said general bus being connected to an element memory for storing a prescribed amount of said element information, to a central processing unit controlling operations of the respective parts of said drawing output unit involving conversion of element information into raster information as well as transfer of raster information to the printer, to an input terminal of an image processor receiving element information from said selement memory through said general bus and converting the received information into raster information to output the converted information to said first raster information dedicated bus, and to a printer controller executing control of said printer, said first raster information dedicated bus being connected to an output terminal of said image processor and input terminals of at least two raster memories, each of which has a capacity for storing such raster information for at least one patge of said recorded image, saids raster information dedicated bus being connected to output terminals of these raster memories and to an input terminal of a video interface receiving such raster information read from either of said raster memories to transfer the received information to said printer, and said printer being connected to said video interface wherein the central processing unit effects the controlling operation in such a manner that the video interface receives raster information from either of said raster memories to transfer the received inforamtion to the printer while outputting the raster information to another raster memory by means of the image processor.

2. A drawing output unit as claimed in claim 1 wherein at least three raster memories are connected to said first and second raster information dedicated buses, and the central processing unit selects sucessively such raster memory which is not receiving the raster information outputted from the image processor to authorize transfer of the raster information to the video interface.

3. A drawing output unit as claimed in claim 1 wherein said general bus is connected to a final controlling element inputting and changing processing information and for processing element information stored in said element memory.

4. A drawing output unit as claimed in claim 3 wherein said processing information involves such priority information assigning a priority for converting the element information for at least two pages of the recorded image stored in the element memory into raster information in every page of said recorded image.

5. A drawing output unit as claimed in claim 3 wherein said processing information involves such reworking information for reworking at least a part of code data for at least one page thereof contained in the element information.

6. A drawing output unit as claimed in claim 5 wherein said processing information comprises such information involving a ratio of enlarging or reducing the recorded image.

7. A drawing output unit as claimed in claim 3 wherein said final controlling element is provided with an input device inputting processing information and a display displaying the contents thereof, and said central processing unit involves a processing information memory storing processing information.

8. A drawing output unit as claimed in claim 7 wherein when priority information is inputted from said final controlling element to store the contents thereof in the processing information memory, said central processing unit instructs a priority for converting element information with respect to the image processor in accordance with said contents thereby executing such conversion.

9. A drawing output unit as claimed in claim 7 wherein when information for reworking is inputted from said final controlling element to store the contents thereof in the processing information memory, said central processing unit reads out the element information stored in the element memory to rework the read out information in accordancace with the information for reworking, whereby new element information is prepared and the prepared information is stored in said element memory.

10. A drawing output unit wherein a prescribed amount of element information consisting of code data for preparing a pattern is stored, said element information is converted into raster information composed of a picture signal corresponding to a recorded image, and the raster information is used to obtain a recorded image, the drawing output unit comprising:

a general bus;
a first raster information dedicated bus;
a second raster information dedicated bus;
a printer;
an element memory connected to the general bus for storing a prescribed amount of said element information;
a central processing unit connected to the general bus for controlling operations of the respective parts of said drawing output unit involving conversion of element information into raster information as well as transfer of raster information to the printer;
an image process having an input terminal connected to the general bus and an output terminal connected to the first raster information dedicated bus for receiving element information from said element memory through said general bus and for converting the received information into raster information to output the converted information to said first raster information dedicated bus;
a printer controller connected to the general bus for executing control of said printer;
raster memory means connected to the first raster information dedicated bus for storing information ouputted from said image processor and connected to the second raster information dedicated bus to output the stored raster information; and
a video interface connected to the raster information dedicated bus and the printer for receiving the stored raster information read from said raster memory means to transfer the received information to said printer.

* * * * *

UNITED STATES PATENT AND TRADEMARK OFFICE
CERTIFICATE OF CORRECTION

PATENT NO. : 4,722,064

DATED : January 26, 1988

INVENTOR(S) : Kazuhiro Suzuki

It is certified that error appears in the above-identified patent and that said Letters Patent is hereby corrected as shown below:

Column 14, line 1, delete "corrsponding", insert --corresponding--;

Column 14, line 5, delete "scond", insert --second--;

Column 14, line 15, delete "selement", insert --element--;

Column 14, line 25, delete "patge", insert --page--;

Column 14, line 26, delete "saids", insert --said--;

Column 14, lines 36-37, delete "inforamtion", insert --information--;

Column 15, line 19, delete "accordancace", insert --accordance--;

Column 16, line 23, delete "ouputted", insert --outputted--.

Signed and Sealed this

Twenty-first Day of June, 1988

Attest:

DONALD J. QUIGG

Attesting Officer

Commissioner of Patents and Trademarks